United States Patent [19]

Nakashima et al.

[11] Patent Number: 4,586,868
[45] Date of Patent: May 6, 1986

[54] WRIST MECHANISM OF AN INDUSTRIAL ROBOT

[75] Inventors: Seiichiro Nakashima, Hino; Shigemi Inagaki, Kokubunji; Susumu Ito, Hino, all of Japan

[73] Assignee: Fanuc, Ltd., Tokyo, Japan

[21] Appl. No.: 624,508

[22] PCT Filed: Oct. 20, 1983

[86] PCT No.: PCT/JP83/00368
§ 371 Date: Jun. 19, 1984
§ 102(e) Date: Jun. 19, 1984

[87] PCT Pub. No.: WO84/01539
PCT Pub. Date: Apr. 26, 1984

[30] Foreign Application Priority Data

Oct. 20, 1982 [JP] Japan ................. 57-182930

[51] Int. Cl.$^4$ ................................. B66C 1/00
[52] U.S. Cl. ..................... 414/735; 901/29; 901/26; 901/12
[58] Field of Search ............. 414/735; 901/12, 13, 901/15, 23–26, 28, 29

[56] References Cited

U.S. PATENT DOCUMENTS 4,113,115 9/1978 Yoshio .................. 901/13

FOREIGN PATENT DOCUMENTS 29266 8/1975 Japan .
205082 12/1982 Japan .
0707793 1/1980 U.S.S.R. .................. 414/735
0763082 9/1980 U.S.S.R. .................. 414/735

OTHER PUBLICATIONS

Rudisiu et al., "Guide to Limit Switches", Product Engineering, Nov. 1962, pp. 81–94.

Primary Examiner—Robert J. Spar
Assistant Examiner—D. Glenn Dayoan
Attorney, Agent, or Firm—Armstrong, Nikaido, Marmelstein & Kubovcik

[57] ABSTRACT

A wrist mechanism of an industrial robot provided at the extremity of the robot arm (20) and having two degrees of freedom of motion enabling a wrist unit (30) to perform a tilting motion and a swivel motion about two substantially perpendicular intersecting axes respectively. Either a motion transmitting mechanism for the tilting motion of the wrist unit or a motion transmitting mechanism for the swivel motion of the wrist unit (80, 82, 90, 92, 96) is provided with a bevel gear mechanism (96) to change the direction of motion transmission through an angle of 90°. Overtravel detecting means (110a, 110b, 120a, 120b) for detecting the overtravel of both the above-mentioned motions and datum position of motion detecting means (112a, 112b, 122a, 122b) are coaxially arranged about one of the above-mentioned perpendicular intersecting axes.

6 Claims, 4 Drawing Figures

WRIST MECHANISM OF AN INDUSTRIAL ROBOT

TECHNICAL FIELD

The present invention relates to a wrist mechanism of an industrial robot and, more particularly, to a wrist mechanism of an industrial robot, having at least two degrees of freedom of motion about two substantially perpendicularly intersecting axes, and provided with detecting means coaxially arranged about one of the axes for detecting the overtravel and the datum position of the robot wrist.

BACKGROUND ART

An industrial robot is provided with a robot wrist attached to the extremity of the robot arm and a robot hand attached to the extremity of the robot wrist and is adapted to perform various robot actions for particular work such as holding, transferring and/or assembling. In order to enable such an industrial robot to carry out such robot actions, an industrial robot is constituted so as to enable the movement and the positional change of the robot hand within a space by giving a degree or degrees of freedom of motion to the robot arm and the robot wrist respectively, and to enable a robot hand to perform holding and other work by the use of its own degree of freedom of motion. Accordingly, driving sources for driving the robot arm and the robot wrist are built into the industrial robot. The driving source of the robot wrist, in particular, is an electric motor or the like mounted on a part or the base end of the robot arm, the rotative motion of which is transmitted through a motion transmitting mechanism disposed within the robot arm to the robot wrist to drive the robot wrist through a motion transmitting mechanism disposed within the robot wrist to enable a tilting motion or swivel motion thereof. It is conventional to store a control program in the robot control unit beforehand and to give commands to the driving source, i.e., the electric motor or the like, according to the control program, in order to control the tilting motion or swivel motion of the robot wrist in a manner appropriate to the objective robot motion. In such a control system, the control program usually includes a so-called overtravel preventing program as well as a motion control program to restrain uncontrolled motion and to restrict the tilting motion and swivel motion of the robot wrist within a predetermined range of motion. However, it is necessary to provide a mechanism capable of detecting the virtual excessive motion of each part of the wrist over the predetermined range of motion quickly and interrupting the uncontrolled motion immediately, in addition to the overtravel preventing measures of a software system, for the security of the robot and for preventing damage to the wiring and the piping arranged within the wrist. Furthermore, in the wrist mechanism of an industrial robot adapted to be driven by an electric motor, it is usual to return each working part of the wrist mechanism always to the datum position of motion upon the connection of the power source to the industrial robot, and desired robot motions are then carried out after the position of each working part of the wrist mechanism has been confirmed. Accordingly, such an industrial robot is provided with so-called near-zero detecting means to detect the datum position or origin of motion.

SUMMARY OF THE INVENTION

It is an object of the present invention to provide an improved constitution for providing the wrist of an industrial robot, which wrist has at least two degrees of freedom of motion about two substantially perpendicularly intersecting axes, with the above-mentioned overtravel detecting means and motion datum position detecting means.

The present invention thus provides a wrist mechanism of an industrial robot having a wrist provided on the robot arm at the extremity thereof and capable of performing motions of at least two degrees of freedom of motion about two substantially perpendicularly intersecting axes, namely, a tilting motion and a swivel motion about two axes respectively, wherein a bevel gear mechanism is provided either in a motion transmitting mechanism for the tilting motion or in a motion transmitting mechanism for the swivel motion to change the direction of transmission of motion through an angle of 90° and the overtravel detecting means or the motion datum position detecting means for both the above-mentioned motions are arranged on and coaxially with one of the perpendicularly intersecting axes. In a preferred embodiment of the present invention, the overtravel detecting means or the motion datum position detecting means comprises a rotary disk dog and switching means adapted to be engaged with or disengaged from the rotary disk dog. Since the above-mentioned wrist mechanism of the present invention enables it to use the working part of the wrist for detecting the overtravel of each motion of the wrist directly, the detection is highly accurate and since the detection of both the overtravel and the near-zero position can be attained by the detecting means arranged on a single axis for each of those two motions, the construction of the wrist mechanism can be made compact.

BEST MODE FOR CARRYING OUT THE INVENTION

Figure 1:
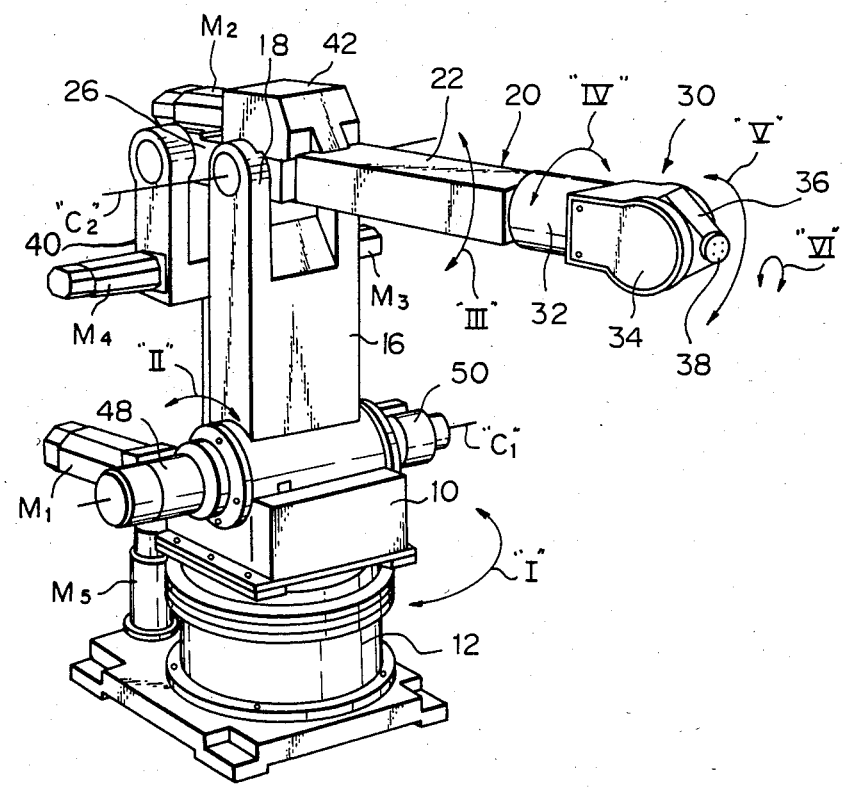
FIG. 1 is a perspective view showing the external construction of an articulated industrial robot representing, by way of example, an industrial robot provided with a wrist mechanism according to the present invention.

FIG. 1 is a perspective view showing an embodiment of an articulated industrial robot equipped with a wrist mechanism according to the present invention. Referring to FIG. 1, the industrial robot has a robot body 10 mounted on a swivel base 12 so as to able to swivel in directions indicated by the arrow "I". The robot body 10 is attached to the swivel base 12 by bolt means or the like. The base end of a robot upper arm 16 is joined to the upper end of the robot body 10 for pivotal motion about an axis $C_1$, so that the robot upper arm 16 is swingable in directions indicated by the arrow "II". A robot forearm 20 is joined, for tilting motion about an axis $C_2$ in directions indicated by the arrow "III", to the upper end 18 of the robot upper arm 16. The robot forearm 20 has a major forearm section 22 extending forward from the axis $C_2$ and a relatively short rear extension 26 extending rearward from the axis $C_2$. A wrist unit 30 is attached to the front end of the major forearm section 22. The wrist unit 30 comprises a wrist base 32, an outer wrist 34 fixed to the wrist base 32, an inner wrist 36 supported on the outer wrist 34 and a hand holding part 38 attached to the inner wrist 36. The wrist base 32 is rotatable together with the outer wrist 34 relative to the major forearm section 22 in directions indicated by the arrow "IV". The inner wrist 36 is rotatable relative to the outer wrist 34 in directions indicated by the arrow "V". Driving sources are provided to drive the robot body 10, the robot upper arm 16, the robot forearm 20 and the wrist unit 30, respectively, for various motions. A motor $M_5$ disposed contiguously to the swivel base 12 drives the robot base 10 in the direction of the arrow "I" through a motion transmitting mechanism arranged within the swivel base 12, a motor $M_1$ drives the robot upper arm 16 in directions indicated by the arrow "II" for swing motion, and a motor, not shown, disposed behind the robot upper arm 16 in parallel to the motor $M_1$ drives the robot forearm 20 for tilting motion in directions indicated by the arrow "III". These motors serving as driving sources and the corresponding driven parts are interlocked by mechanisms such as motion transmitting mechanisms and/or or reduction mechanism to appropriately control the motions of the driven parts. Indicated at 48 and 50 are elements constituting part of those mechanisms.

Three motors $M_2$, $M_3$, and $M_4$ for driving the wrist base 32, the outer wrist 34, the inner wrist 36, respectively, and the hand holding part 38 of the wrist unit 30 attached to the front end of the forearm 20, are mounted collectively on the rear extension 26 of the forearm 20. That is, the motors $M_2$, $M_3$, and $M_4$ are arranged so that the moment of mass of the rear extension 26 including those three motors $M_2$, $M_3$, and $M_4$ about the axis $C_2$ counterbalances the moment of mass of the major forearm section 22 of the forearm 20 about the axis $C_2$. A motion transmitting mechanism or a reduction gear mechanism for transmitting the rotation of the motors $M_3$ and $M_4$ is contained in a housing 40, while a motion transmitting mechanism or a reduction gear mechanism for transmitting the rotation of the motor $M_2$ is contained in a casing 42. The provision of those motors $M_2$, $M_3$, and $M_4$ serving as the driving sources for the motions of three degrees of freedom of motion of the wrist unit 30 on the rear extension 26 of the forearm 20 balances the motion of the forearm 20 about the axis $C_2$. At the same time, the provision of the driving sources of the wrist unit 30 remote from the wrist unit 30 reduces the weight of the wrist unit 30 itself, which reduces the loads on the driving sources of the wrist unit 30, namely, the motors $M_2$, $M_3$, and $M_4$. Although the embodiment of the present invention is shown in FIG. 1 as applied to an articulated industrial robot having the robot body 10 adapted to swivel on the swivel base, a wrist mechanism of the present invention which will be described hereinafter is applicable also to an articulated industrial robot having a robot body adapted to move laterally on a horizontal table. Furthermore, a wrist mechanism of the present invention is also applicable to an industrial robot having a wrist unit attached to the front end of a single linearly telescopic arm, for example, a cylindrical coordinate type robot.

Figure 2:
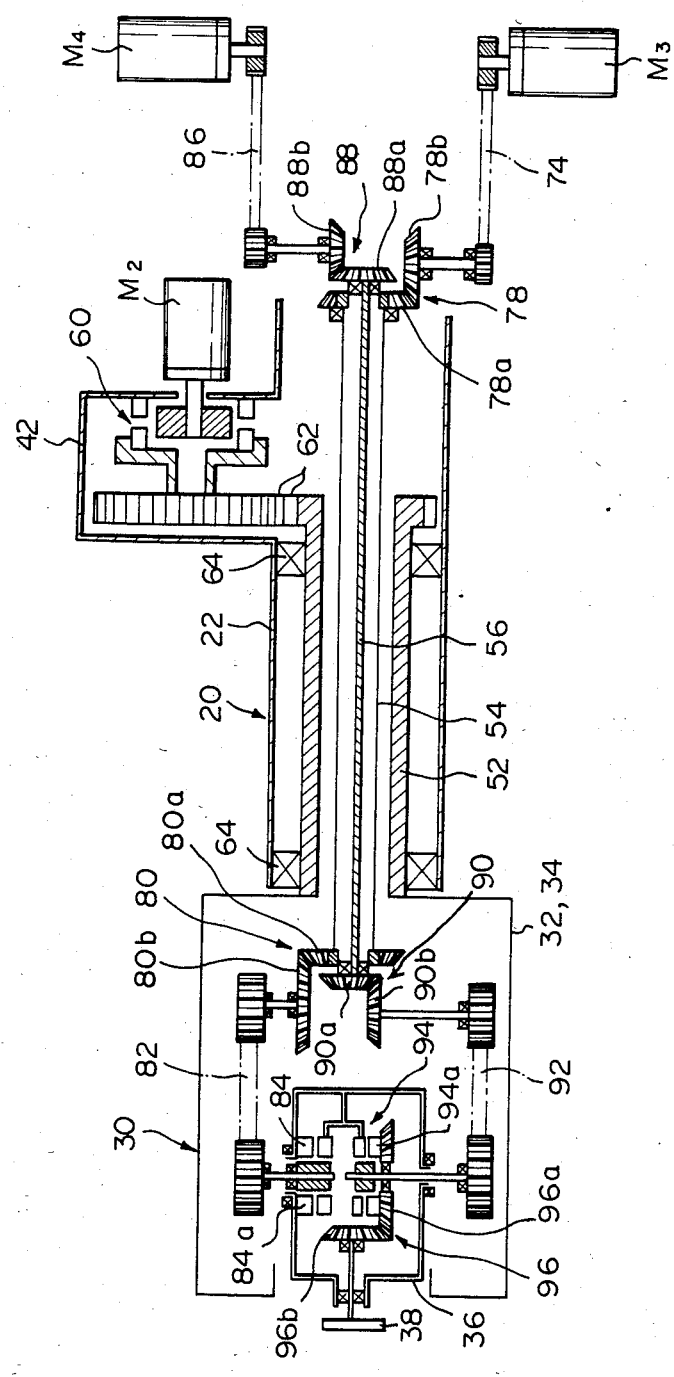
FIG. 2 is a schematic view showing the constitution of a motion transmitting mechanism embodying the present invention, for transmitting motions to the wrist applied to the articulated industrial robot of FIG. 1.

Referring to FIG. 2, motion transmitting mechanisms incorporated into the forearm 20 and the wrist unit 30 of the articulated industrial robot shown in FIG. 1 for giving at least two degrees of freedom of motion, three degrees of freedom of motion in this embodiment, to the wrist unit 30 will be described hereunder with reference to FIG. 2.

Referring to FIG. 2, the motors $M_2$, $M_3$, and $M_4$ serving as the driving sources of the motions of the wrist unit 30 of three degrees of freedom of motion are electric servomotors adapted to be controlled by command signals given by an external robot control unit. The rotative driving force of the motor $M_2$ is reduced in the revolving rate by a reduction gear 60, and then transmitted through a gear mechanism 62 consisting of a pair of meshed gears and provided on the inner end of an outer shaft 52 to the outer shaft 52, and hence to the wrist base 32 fixed to the outer end of the outer shaft 52 and the outer wrist 34 to rotate the outer wrist 34 in the directions indicated by the arrow "V" in FIG. 1. The outer shaft 52 is supported on the major forearm section 22 in bearings 64. Owing to the inherent compact construction and the high reduction ratio, a publicly known harmonic drive reduction gear (Registered trademark) is advantageously applicable to the wrist mechanism as the reduction gear 60. The rotative driving force of the motor $M_3$ is transmitted through a belt-and-pulley mechanism 74 and a bevel gear mechanism 78 consisting of a pair of bevel gears 78a and 78b and provided at the inner end of a middle shaft 54 extended through and coaxially with the outer shaft 52 to the middle shaft 54. The bevel gear mechanism 78 is provided so as to be coaxial with a motion transmitting mechanism for transmitting the rotative force of the motor $M_4$, which will be described afterward, in order to contain three motion transmitting mechanisms compactly within the forearm 20 and the wrist unit 30 and to dispose the motors $M_3$ and $M_4$ on the opposite sides, respectively, of the forearm 20 so that a balanced construction is provided. The rotative force transmitted to the middle shaft 54 is transmitted through a bevel gear mechanism 80 consisting of a pair of bevel gears 80a and 80b and provided at the outer end of the middle shaft 54 and within the outer wrist 34 and through a belt-and-pulley mechanism 82 provided also within the outer wrist 34 to a reduction gear 84 (a harmonic drive reduction gear), and then to the inner wrist 36 to which the output wheel 84a of the reduction gear is fixed to drive the inner wrist 36 for tilting motion about an axis extending substantially perpendicular to the axis of rotation of the middle shaft 54, as indicated by the arrow "V" in FIG. 1. The inner wrist 36 is capable of being tilted relatively to the outer wrist 34 in the directions indicated by the arrow "V". Naturally, the hand holding part 38 provided within the inner wrist 36 moves together with the inner wrist 36 in the same directions.

The rotative driving force of the motor $M_4$ is transmitted through a belt-and-pulley mechanism 86 and then through a bevel gear mechanism 88, consisting of a pair of bevel gears 88a and 88b and provided at the inner end of an inner shaft 56 extended through the middle shaft 54 extending through the outer shaft 52, to the inner shaft 56. The rotative driving force transmitted to the inner shaft 56 is further transmitted through a bevel gear mechanism 90 consisting of a pair of bevel gears 90a and 90b and provided at the outer end of the inner shaft 56 and within the outer wrist 34 opposite to the bevel gear mechanism 80 and a belt-and-pulley mechanism 92 to a harmonic drive reduction gear 94 provided within the inner wrist 36, and then to the hand holding part 38 through a bevel gear mechanism 96 consisting of a bevel gear 96a fixed to the output wheel 94a of the reduction gear 94 and a bevel gear 96b. Thus the hand holding part 38 is driven for rotation about an axis which is substantially coaxial with the axis of rotation of the inner shaft 56, in the directions indicated by the arrow "VI" in FIG. 1. That is, the hand holding part 38 is capable of being rotated relative to the inner wrist 36 in the directions indicated by the arrow "VI" thereby rotating a robot hand attached to the hand holding part 38 in the same directions. As described hereinbefore, since the motors $M_2$, $M_3$, and $M_4$ are electric servomotors, the rotary motions of three degrees of freedom of motion of the wrist unit 30 can be controlled to a desired extent according to the commands given by a robot control unit, respectively.

The above-mentioned motion transmitting mechanisms have significant advantages in that the forearm 20 can be constructed in a slender form and that the mechanical rigidity of the forearm 20 can be improved due to the coaxial disposition of the high-speed rotary shafts 54 and 56 inside the low-speed rotary shaft 52 within the forearm 20, by the provision of the two reduction gears 84 and 94 inside the wrist unit 30. The present invention may be embodied in a wrist mechanism, which will be described hereinafter, in which no reduction gear is provided in the wrist unit 30 and reduction gears are disposed contiguously to the motors $M_3$ and $M_4$ respectively, as in the case of the reduction gear associated with the motor $M_2$.

Generally, in the above-mentioned wrist unit 30, the angular extent of tilting motion of the inner wrist 36 is set to approximately 200° about the axis of the tilting motion, whereas the angular extent of the swivel motion of the hand holding part 38 is set to 360° (one full turn) or greater. For example, the hand holding part 38 is designed to cover an angular motion range of 180° in the clockwise direction, and also an angular motion range of 180° in the counterclockwise direction. That is, the hand holding part 38 is designed, to cover a total angular motion range of 360°, and thereby to carry out the desired robot actions.

Accordingly, in the above-mentioned exemplary mechanism of the present invention, the gear ratio between the larger bevel gear 96a and the smaller bevel gear 96b of the bevel gear mechanism 96 is determined selectively to have an appropriate reduction ratio such that at least the clockwise rotation and the counterclockwise rotation each through less than an angle of 180° of the larger bevel gear 96a cause the hand holding part 38 to swivel through a desired angular range of swivel motion. Such a constitution enables the coaxial arrangement of both overtravel or near-zero detecting means for the tilting motion of the inner wrist 36 and overtravel or near-zero detecting means for the swivel motion of the hand holding part 38, on the axis of rotation of the inner wrist 36.

Figure 3:
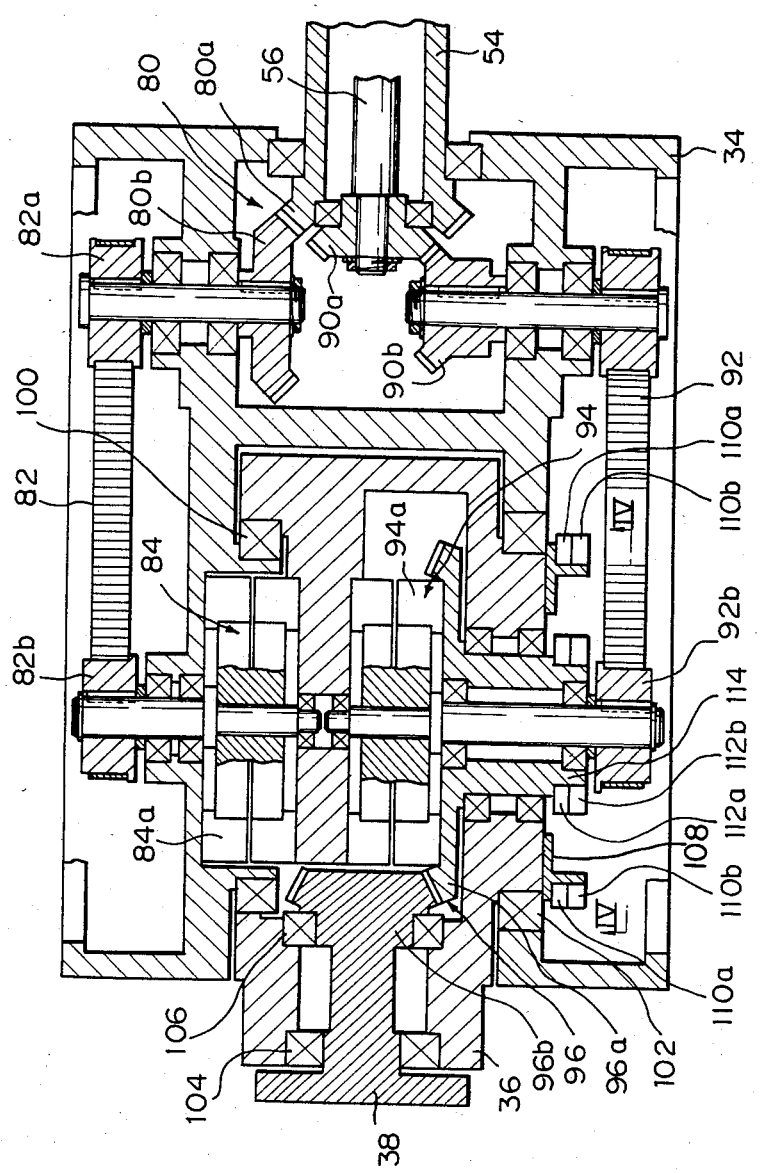
FIG. 3 is a longitudinal sectional view showing an exemplary concrete constitution of a wrist mechanism according to the present invention.
Figure 4:
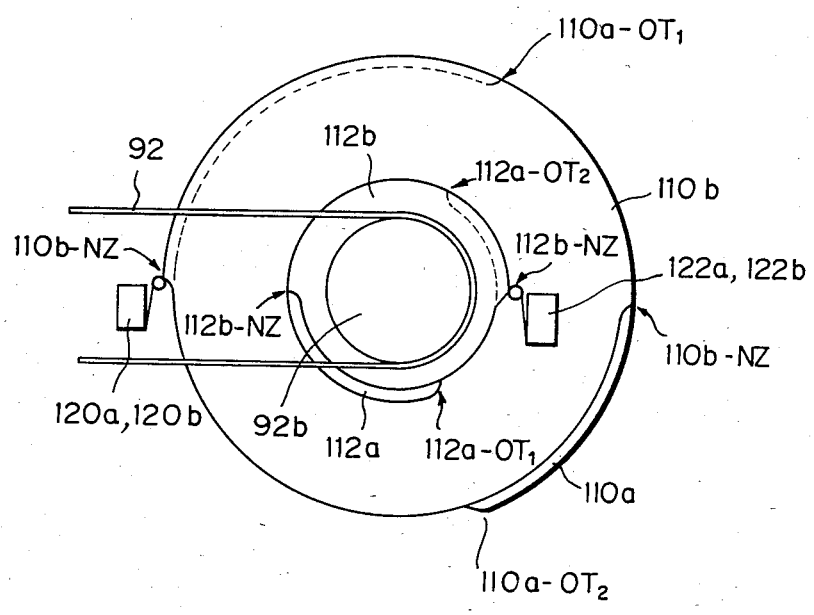
FIG. 4 is a plan view as viewed in the direction of the arrows IV—IV in FIG. 3.

FIG. 3 is a longitudinal sectional view showing an exemplary concrete constitution of a wrist unit 30 provided with the above-mentioned overtravel detecting means and the near-zero detecting means. FIG. 4 is a partial plan view along the line IV—IV of FIG. 3. In FIGS. 3 and 4, the same reference numerals as those in FIG. 2 indicate concrete elements or parts corresponding to the elements or parts shown in FIG. 2.

Referring to FIG. 3, the inner wrist 36 of the wrist unit 30 is supported on the outer wrist 34 in bearings 100 and 102 for tilting motion about the common axis of the bearings 100 and 102 in the direction indicated by the arrow "V" in FIG. 1. An input rotative force for the tilting motion is transmitted to the inner wrist 36 through the driven pully 82b of the belt-and-pulley mechanism 82. The driven pulley 82b is disposed coaxially with the bearings 100 and 102. Naturally, the input rotative force is transmitted to the driven pulley 82b through the middle shaft 54, the bevel gear mechanism 80 and the driving pulley 82a of the belt-and-pulley mechanism 82. On the other hand, the hand holding part 38 is supported rotatably in bearings 104 and 106. The axis of rotation of the hand holding part 38, that is, the center axis of the bearings 104 and 106, is extended substantially perpendicular to the axis of tilting motion of the inner wrist 36. That is, the wrist unit 30 has, within the outer wrist 34, a constitution having two degrees of freedom of motion about three substantially perpendicular intersecting axes. Furthermore, the input rotative force is transmitted to the hand holding part 38 through the driven pulley of a belt-and-pulley mechanism 92 having a pulley 92b disposed coaxially with the driven pulley 82b of the belt-and-pulley mechanism 82, while the direction of transmission of the input rotative force is changed by a bevel gear mechanism 96. Accordingly, the overtravel detecting means and the near-zero detecting means for controlling the tilting motion of the inner wrist 36 include two dog disks 110a and 110b having high-and-low two-step structure and provided on a dog-holding ring 108 fixed to the inner wrist 36, and signal generators. For example, the overtravel of the tilting motion beyond the limit of motion can be detected by actuating a well-known signal generator, such as a limit switch or a photoelectric switch, provided at a preselected position of the outer wrist 34 with a protuberant dog formed at a limit position of the tilting motion in the dog disk 110a when the overtravel of the tilting motion occurs. The datum position and the direction of displacement from the original position (either in one direction or in the opposite direction indicated by the arrow "V" in FIG. 1) can be detected by the engagement between a protuberant dog formed in the dog disk 110b at a position corresponding to the datum position of motion of the inner wrist 36 and a signal generator fixedly provided for engagement with the dog of the dog disk 110b on the outer wrist 34.

The overtravel detecting means and the near-zero detecting means for the hand holding part 38 include dog disks 112a and 112b attached to the end of the boss 114 of the bevel gear 96a coaxially with the two dog disks 110a and 110b, and two signal generators, such as limit switches, fixed to the dog holding ring 108 at preselected positions thereon respectively, whereby the overtravel position and the datum position of motion of the swivel motion of the hand holding part 38 can be detected on the basis of the detection of the angle of rotation of the bevel gear 96a. That is, since the bevel gear 96a and the bevel gear 96b connected directly to the hand holding part 38 are meshed always and constitute a bevel gear mechanism of a fixed reduction ratio, the detection of the overtravel and the near-zero position of the hand holding part 38 can be attained through the detection of the angle of rotation of the bevel gear 96a (the larger bevel gear). FIG. 4 shows a disposition of the dog disks 110a, 110b, 112a, and 112b and the limit switches functioning as the signal generators. In the constitution shown in FIG. 4, the limit switches 102a and 120b which generate an overtravel signal and a near-zero signal respectively to control the inner wrist 36 are disposed side by side in an upper-and-lower relationship at coincident circular positions respectively. The limit switches 122a and 122b, which generate an overtravel signal and a near-zero signal respectively to control the hand holding part 38, are also disposed side by side in an upper-and-lower relationship at coincident circular positions respectively. The dog disks 110a, 110b, and 112a, and 112b each formed in a cam disk designed to engage with or disengage from those limit switches 120a, 120b, 122a and 122b respectively. In FIG. 4, dog positions 110a-$OT_1$ and 110a-$OT_2$ are positions where the dog disk 110a actuates the overtravel detecting limit switch 120a for overtravel detection, a dog position 110b-NZ is a position where the dog disk 110b is engaged with the near-zero detecting limit switch 120b for detecting the datum position of motion (near-zero position), dog positions 112a-$OT_1$ and 112a-$OT_2$ are positions where the dog disk 112a actuates the overtravel detecting limit switch 122a for overtravel detection, and a dog position 112b-NZ is a position where the dog disk 112b is engaged with the near-zero detecting limit switch 112b for the detection of the datum position of motion.

It is apparent from the above description that, according to the present invention, in a wrist unit of an industrial robot, the detection of the overtravel of the motions of two degrees of freedom of motion about two substantially perpendicular intersecting axes of the wrist unit and the detection of the near-zero position of each working part can be attained by the corresponding overtravel detecting means and the near-zero detecting means which are arranged coaxially and compactly.

We claim:

1. A wrist mechanism of an industrial robot comprising:
   an outer wrist member attached to a robot arm of said industrial robot;
   an inner wrist member disposed within and supported by said outer wrist member for tilting motion about a first axis extending laterally through said outer wrist member;
   a first motion transmitting mechanism mounted on said outer wrist member and connected between a first rotative force input means and said inner wrist member to impart a tilting motion to said inner wrist member about said first axis;
   a hand holding part supported in said inner wrist member for rotational movement about a second axis extending substantially perpendicular to said first axis;
   a bevel gear mechanism for driving said hand holding part comprising a first bevel gear mounted on said inner wrist member for rotation about said first axis and a second bevel gear meshed with said first bevel gear and fixed to said hand holding part for rotation about said second axis;
   a second motion transmitting mechanism mounted on said outer wrist member and connected between a second rotative force input means and said first bevel gear to impart rotary motion thereto for causing said bevel gear mechanism to drive said hand holding part in a swivel motion about said second axis; and
   first overtravel detecting means arranged within said outer wrist member coaxially with said first axis and connected between said outer wrist member and said inner wrist member for detecting overtravel of said tilting motion of said inner wrist member, and second overtravel detecting means arranged within said outer wrist member coaxially with said first axis and connected between said outer wrist member and said bevel gear mechanism for detecting overtravel of said swivel motion of said hand holding part.

2. A wrist mechanism as recited in claim 1, wherein said first and second overtravel detecting means are arranged substantially concentrically with each other about said first axis.

3. A wrist mechanism as recited in claim 1, further comprising first datum position detecting means connected between said outer wrist member and said inner wrist member for detecting a datum position of said tilting motion of said inner wrist member, and second datum position detecting means connected between said outer wrist member and said bevel gear mechanism for detecting a datum position of said swivel motion of said hand holding part, said first and second datum position detecting means being arranged coaxially about said first axis.

4. A wrist mechanism as recited in claim 3 wherein said first and second datum position detecting means are arranged substantially concentrically with each other about said first axis.

5. A wrist mechanism as recited in claim 3, wherein each of said first and second overtravel detecting means and said first and second datum position detecting means comprises a rotary disk-type dog and switch means capable of being engaged with or disengaged from said dog.

6. A wrist mechanism as recited in claim 5, wherein said rotary disk-type dogs of said first overtravel detecting means and said first datum position detecting means are fixed to said inner wrist member, said rotary disk-type dogs of said second overtravel detecting means and said second datum position detecting means are fixed to said first bevel gear, and said switch means are mounted on said outer wrist member.

* * * * *